United States Patent Office.

S. B. HEWETT, JR., OF EAGLE GROVE, AND L. P. JONES, OF IOWA FALLS, IOWA, ASSIGNEES OF CHARLES USHER.

*Letters Patent No.* 62,706, *dated March* 5, 1867; *reissue No.* 3,989, *dated May* 24, 1870.

IMPROVEMENT IN COATING IRON AND STEEL.

The Schedule referred to in these Letters Patent and making part of the same.

CHARLES USHER, of Iowa Falls, in the county of Hardin, and State of Iowa, invented certain Improvements in the Manufacture of Iron and Steel, of which the following is a specification.

The nature of this invention consists in plating or coating over wrought iron or steel with a thin coating of molten iron; the molten iron coating being welded by borax or any well-known material or flux used for welding. The borax or such other material may be mixed with the molten iron, so as to form a flux. Also, for many purposes, is chilled the coated metal, so as to produce a very hard surface. By this means is obtained the strength of the wrought iron and the durability of the chilled coating.

The process which is chiefly used in coating the wrought iron or steel is the following, viz:

First, manufacture the steel or wrought iron into whatever article it may be desired to coat; then take a sufficient quantity of malleable or other iron to cover so much of the surface of the article made as it may be wished to coat over, and place it, with a quantity of borax or other welding material, upon the article to be coated, and place them all in a furnace, subjecting them to a sufficiently high degree of heat to melt the coating material. As it is melted it is caused to spread over the surface of the article and form a coating or plate.

If it is desired to give the coated article a very hard surface, it is immediately chilled in any of the known methods.

It is obvious that the *modus operandi* of putting on the coat of molten iron can be varied from the above-described process, and the same result accomplished; as, for instance, the iron may be melted in a crucible, or other proper receptacle, and mixed with borax or other welding material, and poured upon the wrought iron or steel, so as to form a coating, or any other process used, whereby the iron or steel is coated or plated over with molten iron.

There are many articles like plow-shares, horse-shoe-calks, &c., which should be very strong and not liable to break, and which, at the same time, should have a very hard surface to endure constant usage without wearing away. All such articles should be chilled.

Having described processes of applying the invention,

What is claimed as new and desired to be secured by Letters Patent, is—

The employment of molten cast or malleable iron, made into a flux by the use of borax or its equivalent, for coating the surface of wrought iron or steel, substantially as described.

S. B. HEWETT, JR.
L. P. JONES.

Witnesses:
WM. REES,
J. D. GODMAN,
J. S. SHEPARD,
THOS. JAEMAN.